United States Patent
Eda et al.

(10) Patent No.: US 6,892,197 B2
(45) Date of Patent: May 10, 2005

(54) DATABASE TRANSITION SYSTEM AND PROGRAM STORAGE MEDIUM

(75) Inventors: Shinichirou Eda, Kagoshima (JP); Yasushi Koufuku, Kagoshima (JP); Kazuhisa Kubo, Kagoshima (JP); Katsutoshi Maemoto, Kagoshima (JP); Ikuya Kohama, Kagoshima (JP); Takahiro Kurino, Kagoshima (JP); Kouji Yuda, Kagoshima (JP); Kumiko Furujyou, Kagoshima (JP); Toshinori Shiraishi, Kagoshima (JP); Naomi Nagano, Kagoshima (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 09/879,133

(22) Filed: Jun. 13, 2001

(65) Prior Publication Data

US 2001/0047367 A1 Nov. 29, 2001

Related U.S. Application Data

(63) Continuation of application No. PCT/JP99/07183, filed on Dec. 21, 1999.

(51) Int. Cl.$^7$ .............................................. G06F 17/30
(52) U.S. Cl. ......................... 707/4; 707/10; 707/103 R
(58) Field of Search ........................... 707/4, 10, 103 R

(56) References Cited

U.S. PATENT DOCUMENTS 5,263,167 A * 11/1993 Conner et al. ................. 707/4
5,297,279 A * 3/1994 Bannon et al. ........... 707/103 R
5,970,490 A * 10/1999 Morgenstem ................ 707/10

FOREIGN PATENT DOCUMENTS

| JP | 96/10232 | 4/1996 |
| JP | 96/34350 | 10/1996 |
| JP | 10-232803 | 9/1998 |
| JP | 11-504451 | 4/1999 |

* cited by examiner

Primary Examiner—Charles Rones
(74) Attorney, Agent, or Firm—Staas & Halsey LLP

(57) ABSTRACT

An object of the present invention is to provide a database transition system capable of promptly and surely performing a transition from the relational database to the object database, and a program storage medium storing the associated processing program. The database transition system comprises RDB definition information extracting means 11 for extracting RDB definition information from an RDB repository 21 describing therein definition information of the relational database 20 which is a transition object to the object database 30, and repository creating means 12 for creating an ODB repository 31 describing therein definition information of the object database associated with the RDB definition information in accordance with the RDB definition information extracted by the RDB definition information extracting means 11 and for creating correlation information repository 15 defining mutual relationship between the RDB definition information and ODB definition information.

7 Claims, 22 Drawing Sheets

| SET UP OF CLASS | | | | | |
|---|---|---|---|---|---|
| TABLES | | ATTRIBUTES OF MAKER | | | |

| | CLASSIFICATION |
|---|---|
| 1 | MAKER |
| 2 | |
| 3 | |
| 4 | |
| 5 | |
| 6 | |
| 7 | |
| 8 | |
| 9 | |
| 10 | |

| | ITEM NAMES | DIGITS | TYPES |
|---|---|---|---|
| 1 | MAKER CODE | 3 | INT |
| 2 | MAKER NAME | 30 | CHAR |
| 3 | MAIL NUMBER | 8 | CHAR |
| 4 | ADDRESS | 50 | CHAR |
| 5 | TEL | 13 | CHAR |
| 6 | FAX | 13 | CHAR |
| 7 | | | |
| 8 | | | |
| 9 | | | |
| 10 | | | |

CLASSES CREATED     ATTRIBUTES

| | ITEM NAMES | DIGITS | TYPES |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |

[PREVIOUS SCREEN] [COMPLETION]

Fig. 6

SUBDIVISION OF TABLES

BEVERAGE

| | ITEM NAMES | DIGITS | TYPES |
|---|---|---|---|
| 1 | NAME | 50 | CHAR |
| 2 | LARGE CLASSIFICATION | 20 | CHAR |
| 3 | MIDDLE CLASSIFICATION | 20 | CHAR |
| 4 | SMALL CLASSIFICATION | 20 | CHAR |
| 5 | AGE BRACKET | 20 | CHAR |
| 6 | PRICE | 10 | FROAT |
| 7 | MAKER CODE | 3 | INT |
| 8 | DEGREE | 3 | INT |
| 9 | CLASS | 3 | INT |
| 10 | PREFECTURE CODE | 2 | INT |

TABLES
- MAKER
- COUNTRY
- PREFECTURE
- BEVERAGE

[PREVIOUS SCREEN] [NEXT SCREEN]

Fig. 7

SET UP CLASS

CONTENTS OF MIDDLE CLASSIFICATION

| | CLASSIFICATION |
|---|---|
| 1 | SAKE |
| 2 | BEER |
| 3 | NATURAL WATER |
| 4 | PROCESSED WATER |
| 5 | SHOCHU |
| 6 | |
| 7 | |
| 8 | |
| 9 | |
| 10 | |

ATTRIBUTES OF BEVERAGES

| | ITEM NAMES | DIGITS | TYPES |
|---|---|---|---|
| 5 | AGE BRACKET | 20 | CHAR |
| 6 | PRICE | 10 | FROAT |
| 7 | MAKER CODE | 3 | INT |
| 8 | DEGREE | 3 | INT |
| 9 | CLASS | 3 | INT |
| 10 | PREFECTURE CODE | 2 | INT |
| 11 | MALT | 3 | INT |
| 12 | COUNTRY CODE | 3 | INT |
| 13 | PRODUCING CENTER | 30 | CHAR |
| 14 | INGREDIENT | 30 | CHAR |

CLASSES ALREADY CREATED

CLASSES
- MAKER
- COUNTRY
- PREFECTURE

ATTRIBUTES

| | ITEM NAMES | DIGITS | TYPES |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |

[PREVIOUS SCREEN] [COMPLETION]

Fig. 8

| DATABASE NAMES | CLASS NAMES | TABLE NAMES | ATTRIBUTES NAMES | ITEM NAMES |
|---|---|---|---|---|
| CLASS | MAKER | MAKER | MAKER CODE | MAKER CODE |
| CLASS | MAKER | MAKER | MAKER NAME | MAKER NAME |
| CLASS | MAKER | MAKER | ADDRESS | ADDRESS |
| CLASS | BEER | BEVERAGE | MALT | MALT |
| CLASS | BEER | BEVERAGE | COUNTRY CODE | COUNTRY CODE |

| INDEXES | HIERARCHY | SUBDIVISION CONDITIONS |
|---|---|---|
| YES | 1 | |
| NO | 1 | |
| NO | 1 | |
| NO | 3-1-2 | MIDDLE CLASSIFICATIONS='BEER' |
| YES | 3-1-2 | MIDDLE CLASSIFICATIONS='BEER' |

Fig. 13

TRANSITION SCHEDULE SET UP

CLASS AS TRANSITION OBJECT [BEER]

TRANSITION REQUEST PREARRANGED DATA

[1998] YEAR [12] MONTH [25] DATE

TRANSITION REQUEST PREARRANGED TIME

[21] TIME [00] MINUTE

RECIPE FOR ERRORS DURING EXECUTION OF SCHEDULE

⦿ TERMINATE IT, AND EXECUTE SUBSEQUENT SCHEDULES

○ TERMINATE IT, AND SLAND BY SUBSEQUENT SCHEDULES

○ CONTINUE FORCIBLY

[PREVIOUS SCREEN] [COMPLETION]

Fig. 15

| | CLASS NAME | EXECUTION DATES | EXECUTION TIMES | STATES | RESULT INFORMATION |
|---|---|---|---|---|---|
| 1 | COUNTRY | 1998/12/25 | 18:00 | COMPLETION | NORMAL END |
| 2 | PREFECTURE | 1998/12/25 | 18:30 | COMPLETION | ERROR |
| 3 | BEVERAGE | 1998/12/25 | 19:00 | IN EXECUTION | |
| 4 | ALCOHOL | 1998/12/25 | 19:30 | NOT YET EXECUTION | |
| 5 | SOFT DRINKS | 1998/12/25 | 20:00 | NOT YET EXECUTION | |
| 6 | SAKE | 1998/12/25 | 20:30 | NOT YET EXECUTION | |
| 7 | BEER | 1998/12/25 | 21:00 | NOT YET EXECUTION | |
| 8 | NATURAL WATER | 1998/12/25 | 21:30 | NOT YET EXECUTION | |
| 9 | PROCESSED WATER | 1998/12/25 | 22:00 | NOT YET EXECUTION | |
| 10 | SHOCHU | 1998/12/25 | 22:30 | NOT YET EXECUTION | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |

SCHEDULE EXECUTION SITUATION INQUIRY

MENU

Fig. 17

(a) MAKER

| MAKER CODES | MAKER NAMES | HEAD OFFICES | FOUNDING YEARS | ANNUAL SALES |
|---|---|---|---|---|
| 001 | KARYN | TOKYO-TO | 1930 | 1200 HUNDRED MILLION |
| 002 | YONTORY | OSAKA-FU | 1915 | 860 HUNDRED MILLION |
| 003 | YUHI | TOKYO-TO | 1896 | 1130 HUNDRED MILLION |
| 004 | HAKODATE | TOKYO-TO | 1967 | 680 HUNDRED MILLION |
| 005 | COCA-COLA | AICHI-KEN | 1980 | 2300 HUNDRED MILLION |

(b) BEVERAGE

| NAME | LARGE CLASSIFICATIONS | MIDDLE CLASSIFICATIONS | SMALL CLASSIFICATIONS | AGE BRACKETS | PRICES | MAKER CODE |
|---|---|---|---|---|---|---|
| KARYN TANREI | ALCOHOL | BEER | BOTTLE | 30'S | 300 | 001 |
| KOKEN NO IWASHIMIZU | SOFT DRINKS | NATURAL WATER | CAN | 10'S | 120 | 012 |
| MIZUMIZUSHII MIZU | SOFT DRINKS | PROCESSED WATER | PET BOTTLE | 20'S | 150 | 004 |
| RAKER | ALCOHOL | BEER | CAN | 20'S | 220 | 001 |
| ETSU NO KANBAI | ALCOHOL | SAKE | BOTTLE | 40'S | 1300 | 002 |

| DEGREES | CLASSES | PREFECTURE CODE | MOLTS | COUNTRY CODE |
|---|---|---|---|---|
| 20 | | | 15% | 002 |
| 10 | | 003 | | |
| 35 | 1 | 007 | 20% | 003 |
| | | 010 | | |

Fig. 22

DATABASE TRANSITION SYSTEM AND PROGRAM STORAGE MEDIUM

This application is a continuing application, filed under 35 U.S.C. §111(a), of International Application PCT/JP99/07183, filed Dec. 21, 1999, it being further noted that priority is based upon Japanese Patent Application 11-011581, filed Jan. 20, 1999.

TECHNICAL FIELD

The present invention relates to a database transition system for changing over an existing relational database to an object database, and a program storage medium storing the associated processing program.

BACKGROUND ART

Hitherto, in a data base system of a computer, there is widely used a relational database (RDB). Recently, however, with the advance of the associated technology of the Internet and multimedia, there is increased such a pattern that the relational database (RDB) is changed over to an object database (ODB) suitable for those processing.

FIG. 22 is a view showing an example of RDB data.

An RDB comprises, usually, an assembly of data files of two-dimensional table format, which are referred to as "tables".

Part (a) of FIG. 22 shows a part of tables of an RDB addressed as "makers". Part (b) of FIG. 22 shows a part of tables of an RDB addressed as "beverages". Columns of "maker codes", "maker names", . . . , and "annual sales" displayed on the uppermost stage of the table referred to as the "makers" shown in part (a) of FIG. 22 are addressed as items. "001", "Karyn", . . . , and "1200 hundred million" appearing on the first line are data associated with the respective items mentioned above. A set of those data is referred to as a record. A single table "makers" is constituted of a plurality of records as mentioned above.

Part (b) of FIG. 22 shows a part of tables of an RDB addressed as "beverages". The "beverages" table has 12 items such as "names", "large classification", . . . , and "country codes". Of those items, seventh item is named "maker codes" which is the same name as the first item of the "makers" table. In this manner, the "makers" table and the "beverages" table, which have the same item "maker codes", are associated with each other by means of comparing the values of the "maker codes" with one another, for example, "001" of the first record of the "makers" table with "001" of the first record and the fourth record of the "beverages" table, so that a relational database system is constructed.

Thus, in the RDB, an item name and the associated data type and number of characters are defined for each table, and the definition information is described in a so-called RDB repository (definition information management list). In the RDB, usually, operations such as registration, supplement, deletion, alteration, retrieval of data are performed in accordance with the database operation language referred to as the SQL. For a regular form of data processing work involving a database operation, an application program written by the SQL is created and used.

As explained above, the RDB is simple in structure and be easily understood. And thus the RDB has an advantage that constructions of a database, a creation of an application program and maintenance are easy. On the other hand, the RDB is involved in such a problem that the association among tables must be strictly defined for constructions. Further, as shown in part (b) of FIG. 22, there is a possibility that a large number of records free from data associated with items such as "degree", "class" and "malt" of the "beverages" table exist. Thus, the RDB is also involved in such a problem that utility efficiency of storage areas of a computer is lowered and an access speed to a database is lowered.

FIG. 23 is a view showing an example of ODB data.

Usually, in the ODB, ones corresponding to tables and items of the RDB are referred to as "class" and "attribute", respectively.

In the ODB of the name "classes" shown in FIG. 23, ones such as "maker", "drink", "alcohol", "beer", "sake", "soft drink", and "natural water", which are coupled by solid lines, are "classes". And ones such as "maker code", "name" and "malt", which are coupled with the associated upper hierarchy of classes by broken lines, respectively, are "attributes". It is sufficient for each class to have inherent information. The upper hierarchy of attribute information is automatically succeeded to. For example, a definition of only the peculiar attributes to the "beer" such as "malt" and "country code" causes all of the "degree" attribute of the upper class "alcohol", and "name" attribute, "age bracket" attribute, . . . and "small classification" attribute of the upper class "beverages" to be succeeded to as the attribute of the "beer" class. The ODB has the characteristic as mentioned above, and thus it is very free in the association among the classes. In view of such a characteristic, the ODB is being widely used in fields of the Internet and multimedia associations.

Hitherto to change over the RDB to the ODB, it is necessary to perform the following transition works with manual operation.

(1) analysis of RDB data (2) study of a transition scheme to the ODB (3) creation of program of extracting transition data from the RDB (4) creation of data storage program to the ODB Thus, there is a need to manage with medium such as a paper various sorts of management information such as definition information of the necessary RDB and definition information of the ODB. Those works need a long time. And hitherto there is no transition-supporting tool for supporting those transition works. This is associated with a problem that errors due to manual operation are easy to happen.

As the database manipulation language for RDB, an SQL (Structured Query Language) is mainly used, and as the database manipulation language for ODB, an ODQL (Object oriented Database Query Language) is mainly used. To convert the application program of the RDB into the application program of the ODB, there is a need to perform a conversion work by the SQL and the ODQL which are quite different from each other. This requires a conversion work of a long term being equal to a term for newly developing the application program.

DISCLOSURE OF THE INVENTION

In view of the foregoing, it is an object of the present invention to provide a database transition system capable of promptly and surely performing a transition from the relational database to the object database, and a program storage medium storing the associated processing program.

To achieve the above-mentioned object, the present invention provides a database transition system for changing over an existing relational database to an object database, said database transition system comprising:

RDB definition information extracting means for extracting RDB definition information from an RDB repository describing therein definition information of the relational database which is a transition object to the object database; and repository creating means for creating an ODB repository describing therein definition information of the object database associated with the RDB definition information in accordance with the RDB definition information extracted by said RDB definition information extracting means and for creating correlation information repository defining mutual relationship between the RDB definition information and ODB definition information.

In the database transition system according to the present invention as mentioned above, it is preferable that said database transition system further comprises data transition means for converting data of the relational database into the object database in accordance with the correlation information repository created by said repository creating means.

In the database transition system according to the present invention as mentioned above, it is also preferable that said database transition system further comprises application program conversion means for converting an application program described in a relational database based language into an application program described in an object database based language in accordance with the correlation information repository created by said repository creating means.

To achieve the above-mentioned object, the present invention provides a program storage medium storing a database transition processing program for changing over an existing relational database to an object database, wherein said database transition processing program comprises:

RDB definition information extracting means for extracting RDB definition information from an RDB repository describing therein definition information of the relational database which is a transition object to the object database; and repository creating means for creating an ODB repository describing therein definition information of the object database associated with the RDB definition information in accordance with the RDB definition information extracted by said RDB definition information extracting means and for creating correlation information repository defining mutual relationship between the RDB definition information and ODB definition information.

In the program storage medium according to the present invention as mentioned above, it is preferable that said database transition processing program further comprises data transition means for converting data of the relational database into the object database in accordance with the correlation information repository created by said repository creating means.

In the program storage medium according to the present invention as mentioned above, it is also preferable that said database transition processing program further comprises application program conversion means for converting an application program described in a relational database based language into an application program described in an object database based language in accordance with the correlation information repository created by said repository creating means.

Incidentally, the respective means referred to in the database transition-processing program of the present invention imply means on a software basis used when they are installed in a computer. On the other hand, the respective means referred to in the database transition system of the present invention imply a combination of means on a software basis used when they are installed in a computer and means on a hardware basis to activate the means on a software basis.

As mentioned above, according to the database transition system of the present invention, there are provided with RDB definition information extracting means and correlation information repository creating means. This feature makes it possible to remarkably reduce a transition working time, since the database transition is surely and promptly performed, and also to considerably reduce mistakes on a design matter. Further, according to the database transition system of the present invention, it is possible to readily perform a document management, since a database document is automatically created.

In the event that a database transition system having data transition means is used, there is no need to create a program for data conversion since a conversion from RDB data to ODB data is automatically performed. And a working efficiency is remarkably improved since scheduling automatically performs the transition.

In the that a database transition system having application program conversion means is used, it is possible to remarkably reduce a transition working time since a conversion from RDB application program to ODB application program is automatically performed. It is possible for a user having no knowledge of ODQL to readily perform the conversion. Further, according to the database transition system of the present invention, it is possible to readily perform a document management, since a program document is automatically created.

The use of the program storage medium of the present invention makes it sure and easy to use the database transition system, and thereby remarkably reducing the working cost.

BRIEF DESCRIPTION OF THE DRAWINGS

FIG. 6 is a view showing a class set up screen for selecting class and attribute of an ODB from items of an RDB table.

FIG. 7 is a view showing a subdivision item selection screen.

FIG. 8 is a view showing a class set up screen.

FIG. 13 is a view showing a structure of a correlation information repository created in accordance with the present embodiment.

FIG. 15 is a view showing a transition schedule set up screen in "data transition" processing.

FIG. 17 is a view showing "execution situation inquiry" displayed by data transition means.

FIG. 22 is a view showing an example of RDB data.

BEST MODE FOR CARRYING OUT THE INVENTION

Embodiments of a database transition system of the present invention will be described with reference to the accompanying drawings.

Figure 1:
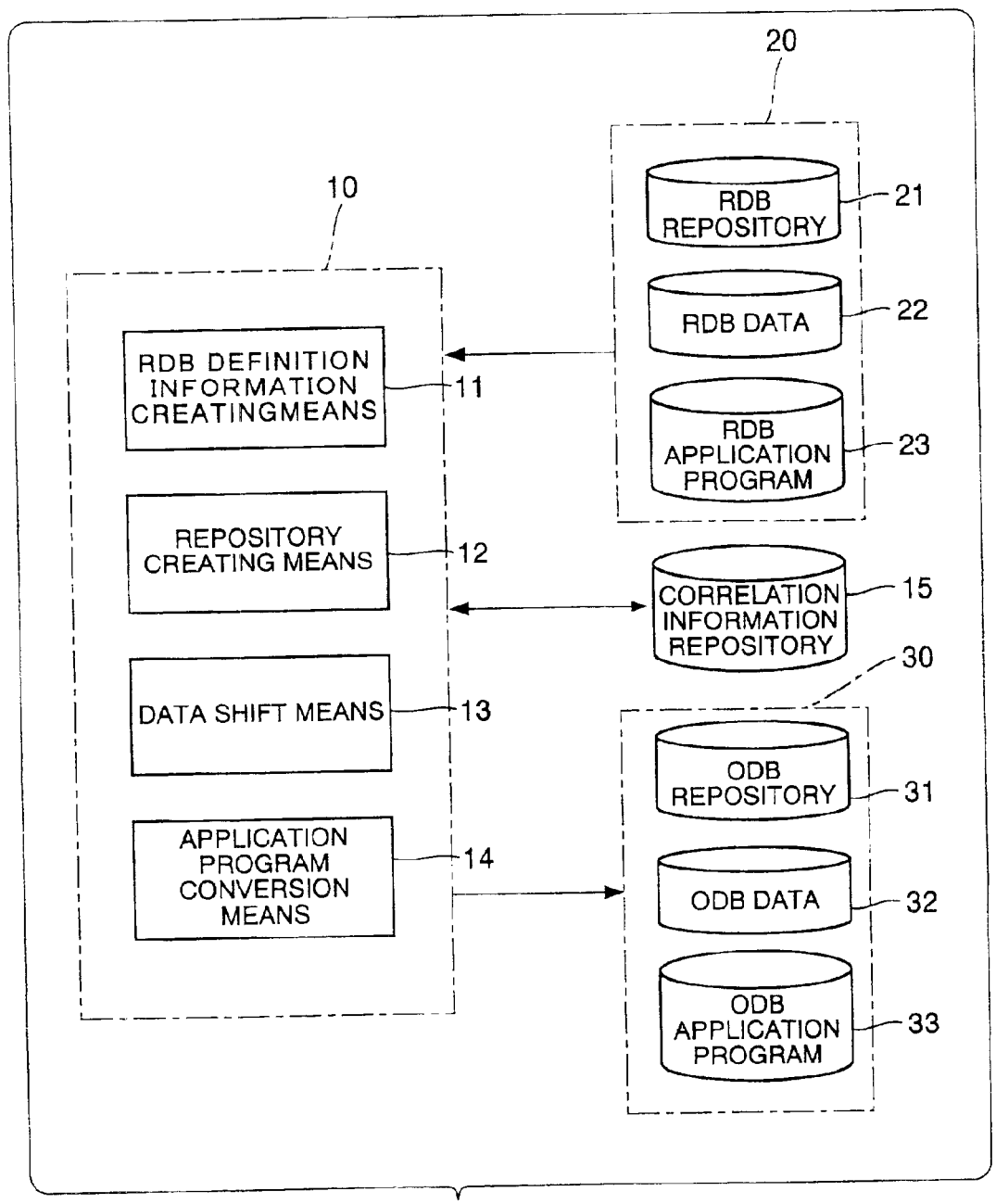
FIG. 1 is a conceptual view of a database transition system of the present invention.

FIG. 1 is a conceptual view of a database transition system of the present invention.

As shown in FIG. 1, a database transition system 10 changes over an existing relational database 20 to an object database 30. The database transition system 10 comprises RDB definition information extracting means 11 for extracting RDB definition information from an RDB repository 21 describing therein definition information of the relational database 20 which is a transition object to the object database 30, and repository creating means 12 for creating an ODB repository 31 describing therein definition information of the object database associated with the RDB definition information in accordance with the RDB definition information extracted by the RDB definition information extracting means 11 and for creating correlation information repository 15 defining mutual relationship between the RDB definition information and ODB definition information.

The database transition system 10 of the present embodiment further comprises data transition means 13 for converting RDB data 22 of the relational database 20 into ODB data in accordance with the correlation information repository 15 created by the repository creating means 12 to change over the converted ODB data to the object database 30, and application program conversion means 14 for converting an RDB application program 23 described in a relational database based language into an ODB application program 33 described in an object database based language in accordance with the correlation information repository 15 created by the repository creating means 12.

The database transition processing program constituting the respective means of the database transition system 10 is stored in a program storage medium for a usual computer, for example, a CD-ROM, and is installed in a computer having the following structure as set forth below for use.

Figure 2:
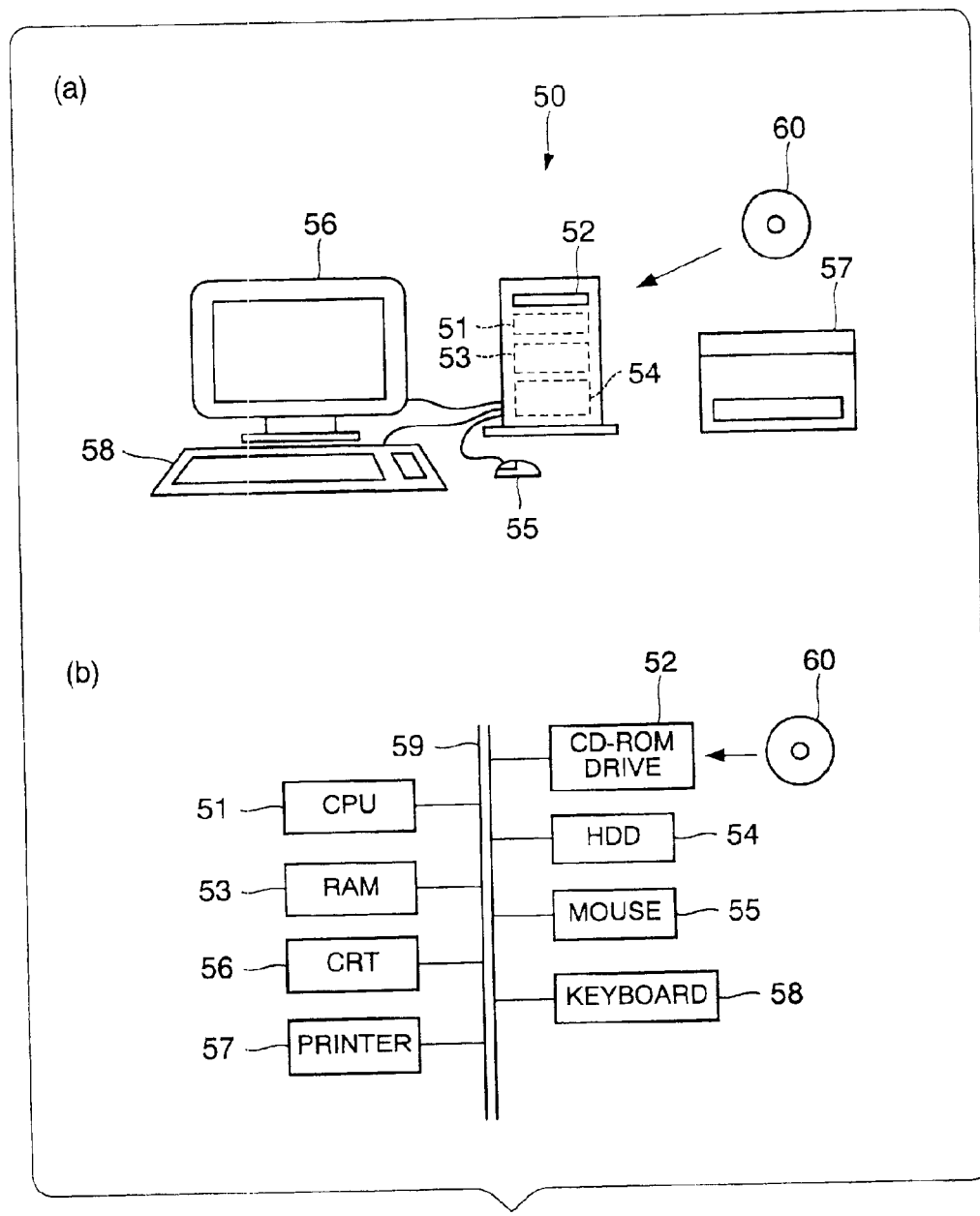
FIG. 2 shows a perspective view (a) of a computer in which a database transition system of the present invention is applied, and an internal structural view (b).

FIG. 2 shows a perspective view (a) of a computer in which a database transition system of the present invention is applied, and an internal structural view (b).

As shown in part (a) of FIG. 2 and part (b) of FIG. 2, a computer 50 comprises a CPU 51, a CD-ROM drive 52, a memory 53, a magnetic disk 54, a mouse 55, a display unit 56, a printer 57, and a keyboard 58, which are connected to each other by a system bus 59, having a usual GUI (a graphic user interface) function. A CD-ROM 60 storing the database transition-processing program of the present invention is inserted into the CD-ROM drive 52 of the computer 50 so that the database transition-processing program is installed in the magnetic disk 54. Thus the database transition system of the present invention is operable.

According to the computer 50 shown in FIG. 2, as a program storage medium storing the database transition-processing program, the CD-ROM 60 is used. However, the program storage medium referred to in the present invention is not restricted to the CD-ROM, and includes a program storage medium such as an optical disk, an optical magnetic disk, a floppy disk, and a magnetic tape, and also an internal storage unit such as a magnetic disk unit in which the database transition-processing program is installed.

When the database transition-processing program starts, the following main menu screen is displayed.

Figure 3:
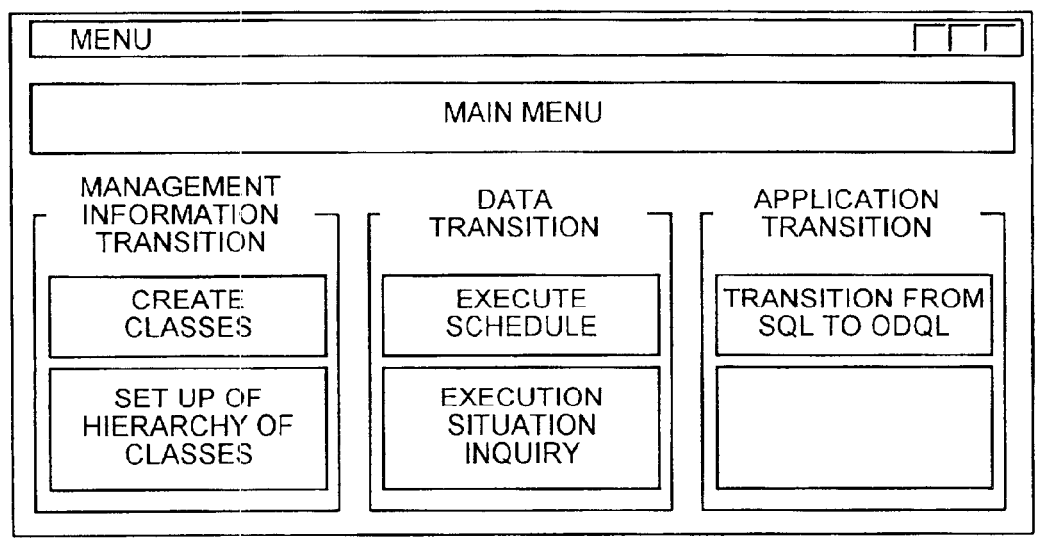
FIG. 3 is a main menu screen of a database transition system of the present invention.

FIG. 3 is a main menu screen of a database transition system of the present invention.

As shown in FIG. 3, a main menu comprises three sub-menus of "management information transition", "data transition" and "application transition". The sub-menu "management information transition" comprises two detailed menus "creation of classes" and "set up of hierarchy of classes". The sub-menu "data transition" comprises two detailed menus "schedule execution" and "execution situation inquiry". The sub-menu "application transition" comprises a detailed menu "transition From SQL to ODQL".

To change over an existing relational database to an object database in accordance with the database transition system of the present embodiment, there is a need to sequentially proceed with processes in accordance with orders of the three sub-menus as mentioned above.

First, there will be described the sub-menu "management information transition".

The sub-menu "management information transition" corresponds to the RDB definition information extraction means and repository creation means referred to in the present invention.

When the "creation of classes" of the sub-menu "management information transition" in the main menu screen shown in FIG. 3 is clicked using a pointing device such as a mouse, processing is initiated by the RDB definition information transition means 11 of the database transition system 10 shown in FIG. 1.

Figure 4:
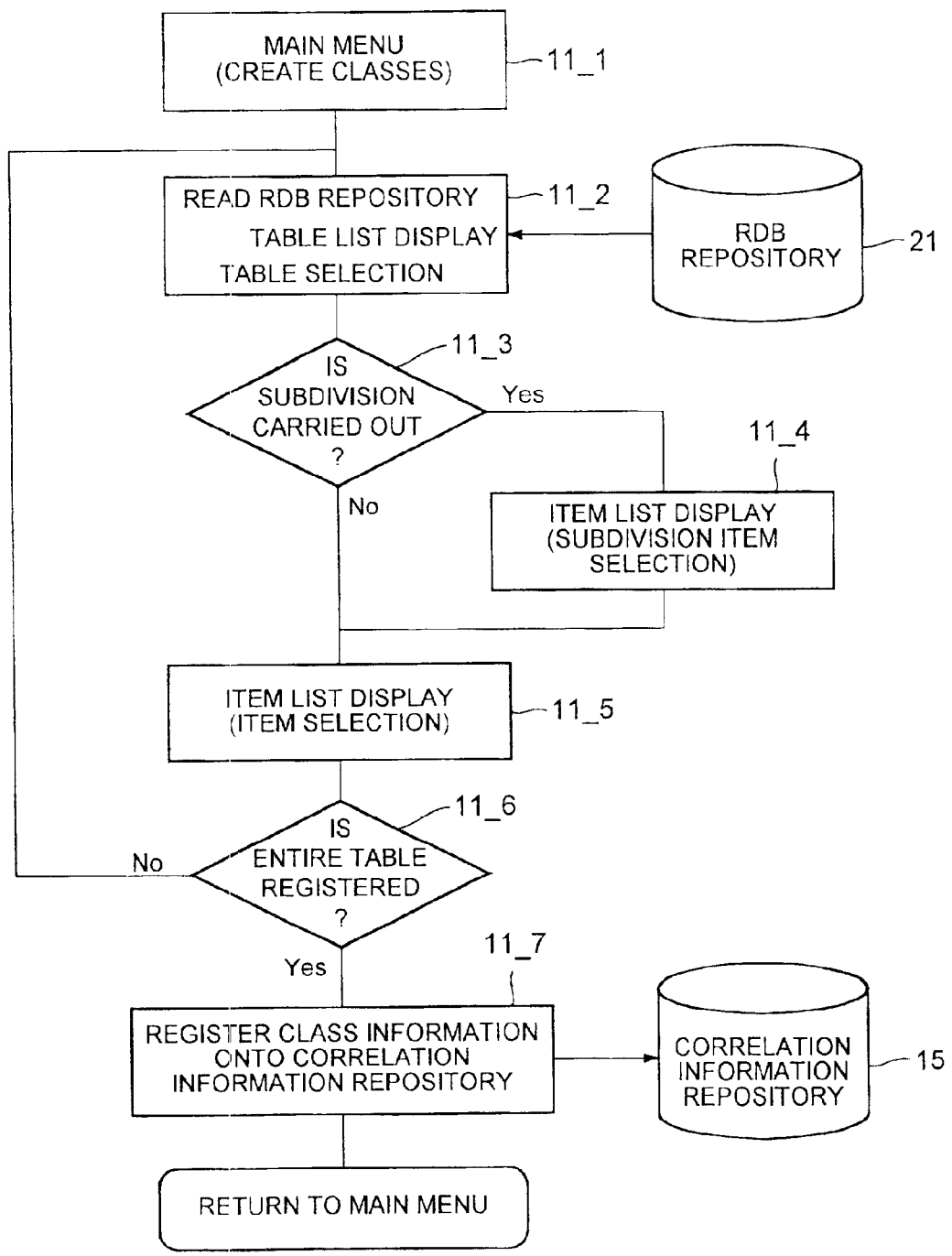
FIG. 4 is a flowchart for "creation of classes" processing executed by RDB definition information generating means in the present embodiment.

FIG. 4 is a flowchart for "creation of classes" processing executed by RDB definition information generating means in the present embodiment.

As shown in the flowchart of FIG. 4, when "creation of classes" of the main menu (cf. FIG. 3) is clicked (step 11_1), a table list, which is a part of the RDB definition information, is read from the RDB repository 21 and is displayed on the screen of the display unit (step 11_2).

Figure 5:
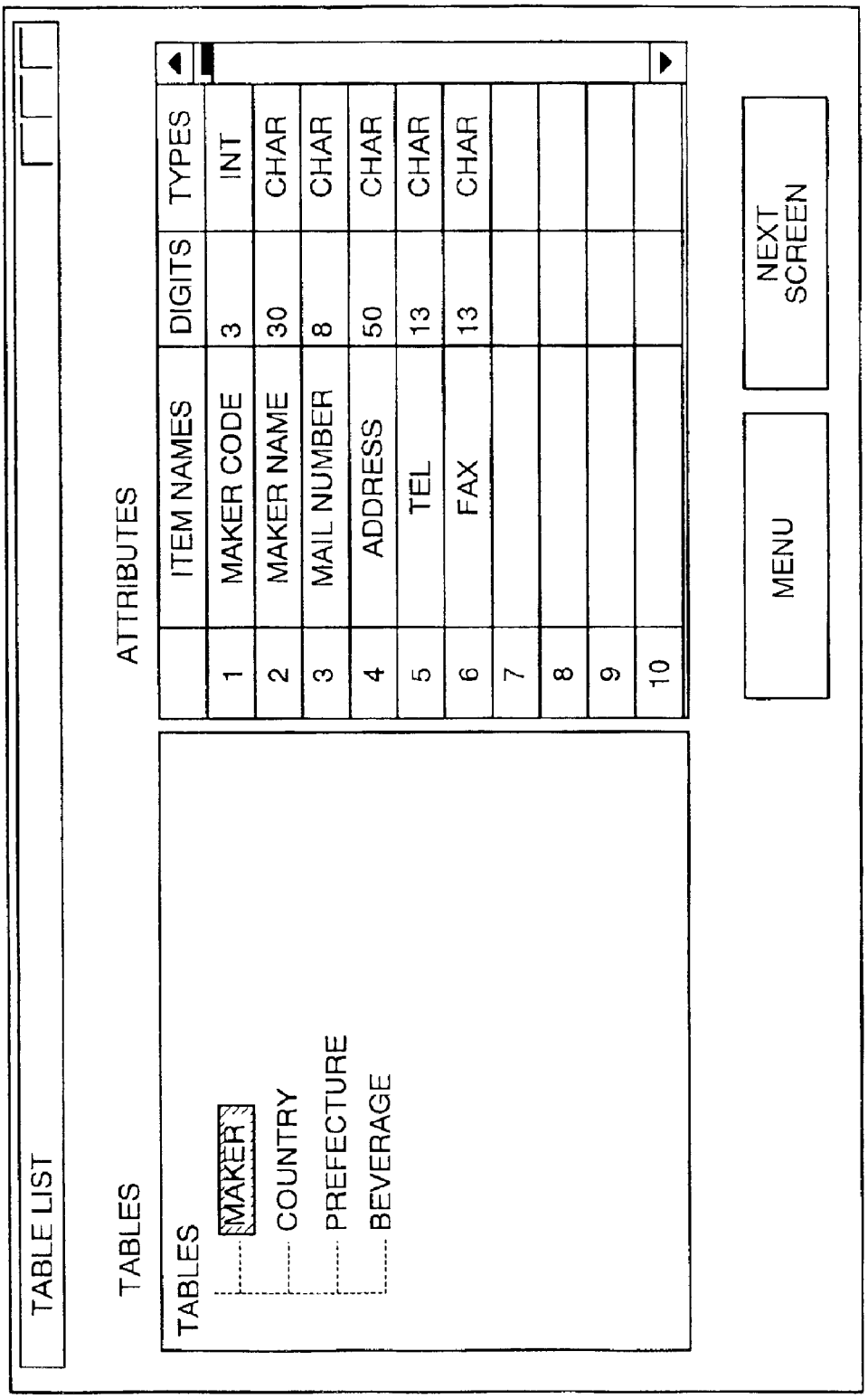
FIG. 5 is a view showing a table list display screen for RDB as an object in transition.

FIG. 5 is a view showing a table list display screen for RDB as an object in transition.

This table list display screen serves as a table selection screen for performing a table selection by a user, too. On the window at the left side of the screen of FIG. 5, there are displayed four table names of "makers", "countries", "prefectures" and "beverages", which constitute the relational database as the transition object. When the table "makers" is clicked, on the window at the right side of the screen, there are displayed attributes of the table "makers", that is, item names, types and digits. According to the example of FIG. 5, the table "makers" is selected, and on the window at the right side of the screen, there are displayed attributes as to six items of "maker code", "maker name", "mail number", "address", "TEL" and "FAX", of the table "makers", that is, the item names, the digits, and the types, as shown in FIG. 5.

On this table selection screen, when the button "next screen" at the lower right of the screen is clicked, a message "Is the subdivision performed?" is displayed, and a decision as to whether the subdivision is performed is made (step 11_3). Incidentally, on the table selection screen of FIG. 5, the button "menu" is clicked instead of click of the button "next screen", the process returns to the main menu.

The subdivision implies that a value of some item of RDB is derived in form of another class. When "subdivision is not to be performed" is clicked, the class set up screen shown in FIG. 6 is displayed.

FIG. 6 is a view showing a class set up screen for selecting class and attribute of an ODB from items of an RDB table.

On the window at the right side of the screen of FIG. 6, there is displayed an item list of the table "makers". Items to be defined as an attribute of class "makers" are selected among from items of the item list (step 11_5). According to the example of FIG. 6, three items of "maker code", "maker name" and "TEL" are selected.

Thus, after the attributes are selected, the button "completion" at the lower right of the screen is clicked. Then, a massage that "are the entire tables registered?" is displayed, and a user clicks any one of buttons "yes" and "no" (step 11_6). In the step 11_6, when the button "no" is clicked, the process returns to the step 11_2 in which the table selection screen shown in FIG. 5 is again displayed. In the step 11_6, when the button "yes" is clicked, the process goes to a step 11_7 in which class information defining a mutual relationship between RDB definition information and ODB definition information is registered in the correlation information repository 15 (cf. FIG. 1). Here, there will be made the explanation assuming that the button "no" is clicked.

At the step that the button "no" is clicked, so that the table selection screen shown in FIG. 5 is again displayed, the table "beverage" is selected and "next screen" is clicked (step 11_2), and on a subdivision yes or no selection screen to be displayed next (step 11_3), when "it is subdivided" is selected, the subdivision item selection screen shown in FIG. 7 is selected (step 11_4).

FIG. 7 is a view showing a subdivision item selection screen.

On the subdivision item selection screen shown in FIG. 7, the table "beverage" is selected from among the tables displayed on the window at the left side of the screen, the item "middle classification" is selected, as the subdivision item, from among the items displayed on the window at the right side of the screen, and the button "next screen" is clicked. Then a class set up screen shown in FIG. 8 is displayed.

FIG. 8 is a view showing a class set up screen.

On the window at the upper left of the screen shown in FIG. 8, there are displayed values of data of the middle classification, for example, "sake", "beer", . . . "shochu", and on the window at the lower portion of the screen shown in FIG. 8, there are displayed classes already created, for example, "maker", "country", and "prefecture". When a user selects "beer" on the window at the upper left of the screen, the item list of the table "beverage" is displayed on the window at the upper right of the screen. Thus, the user selects the value of "middle classification" of interest, for example, "beer", and as the attributes, for example, "malt" and "country code" as well, and clicks the button "completion" at the lower right of the screen in FIG. 8 (the step 11_5). This operation makes it possible to set up "malt" and "country code" as the attributes subdivided in the class "beer".

Next, a message "is the entire tables registered?" is displayed (the step 11_6), and then the button "yes" is clicked, so that class information defining a mutual relationship between RDB definition information and ODB definition information is registered in the correlation information repository 15 (cf. FIG. 1) (the step 11_7).

Incidentally, on the lower portion of the screen in FIG. 8, there is displayed classes already created, so that correction works such as an alteration of class names and an alteration of attribute names of the respective class names can be carried out on the screen in FIG. 8. When the button "completion" displayed at the lower right of the screen in FIG. 8, "creation of classes" is completed.

After "creation of classes" is completed, "set up of hierarchy of classes" is performed.

Figure 9:
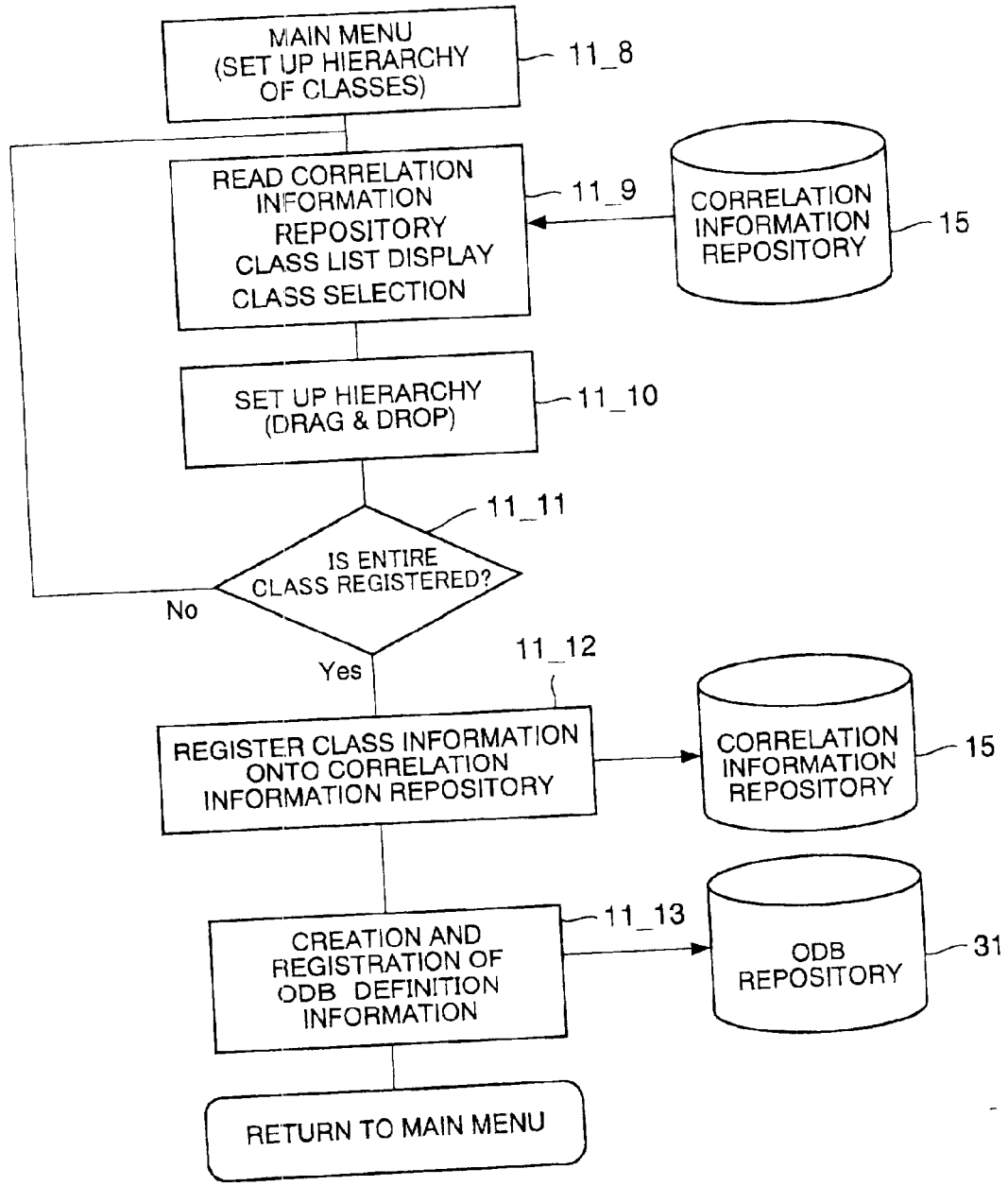
FIG. 9 is a flowchart for "set up of hierarchy of classes" processing executed by RDB definition information generating means 11.

FIG. 9 is a flowchart for "set up of hierarchy of classes" processing executed by RDB definition information generating means 11.

Figure 10:
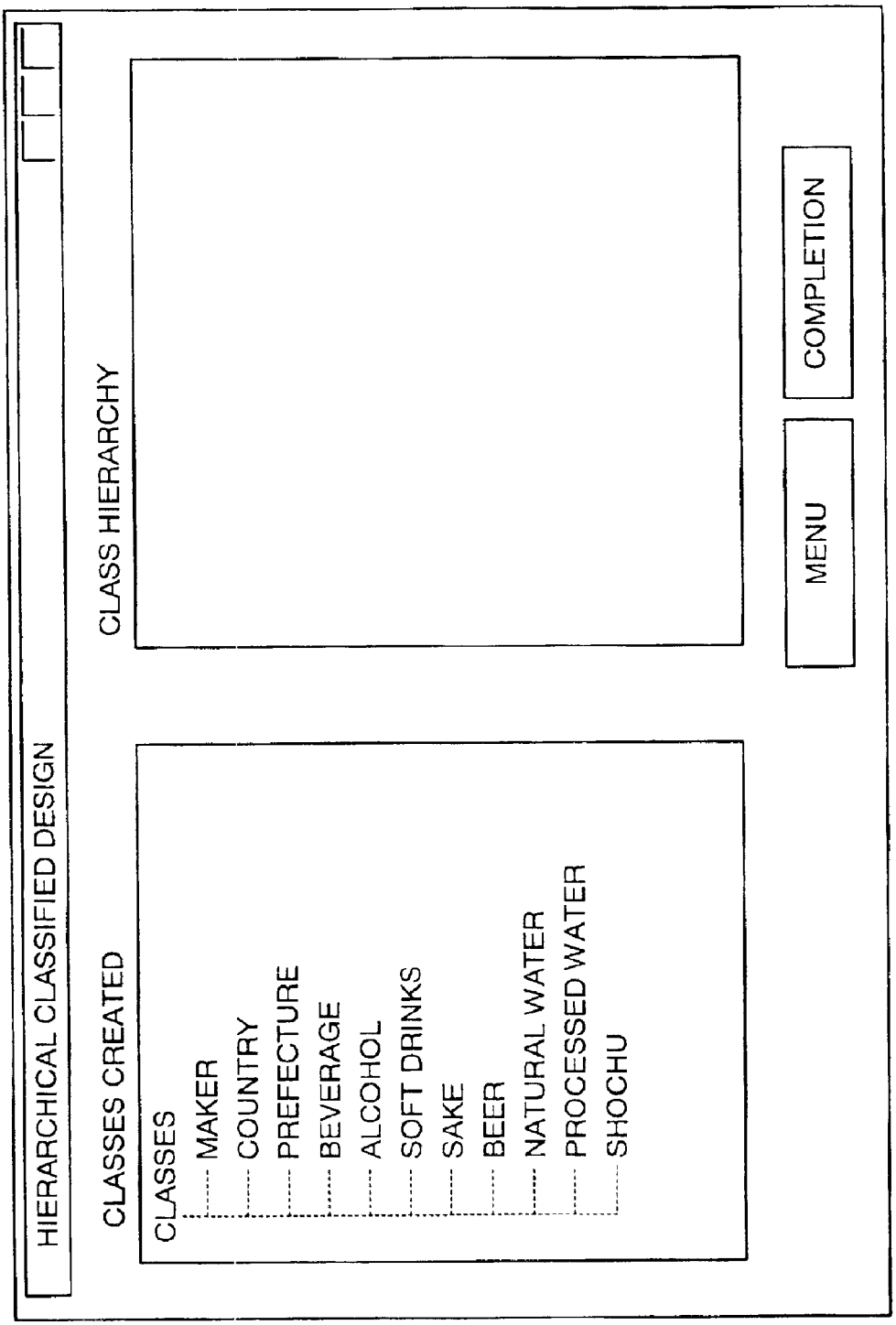
FIG. 10 is a view showing a first screen of a screen of hierarchical classified design.

In the main menu screen shown in FIG. 3, when "set up of hierarchy of classes" in the submenu "management information transition" is clicked, the set up of hierarchy of classes starts, so that a screen of hierarchical classified design shown in FIG. 10 is displayed (step 11_8).

Figure 11:
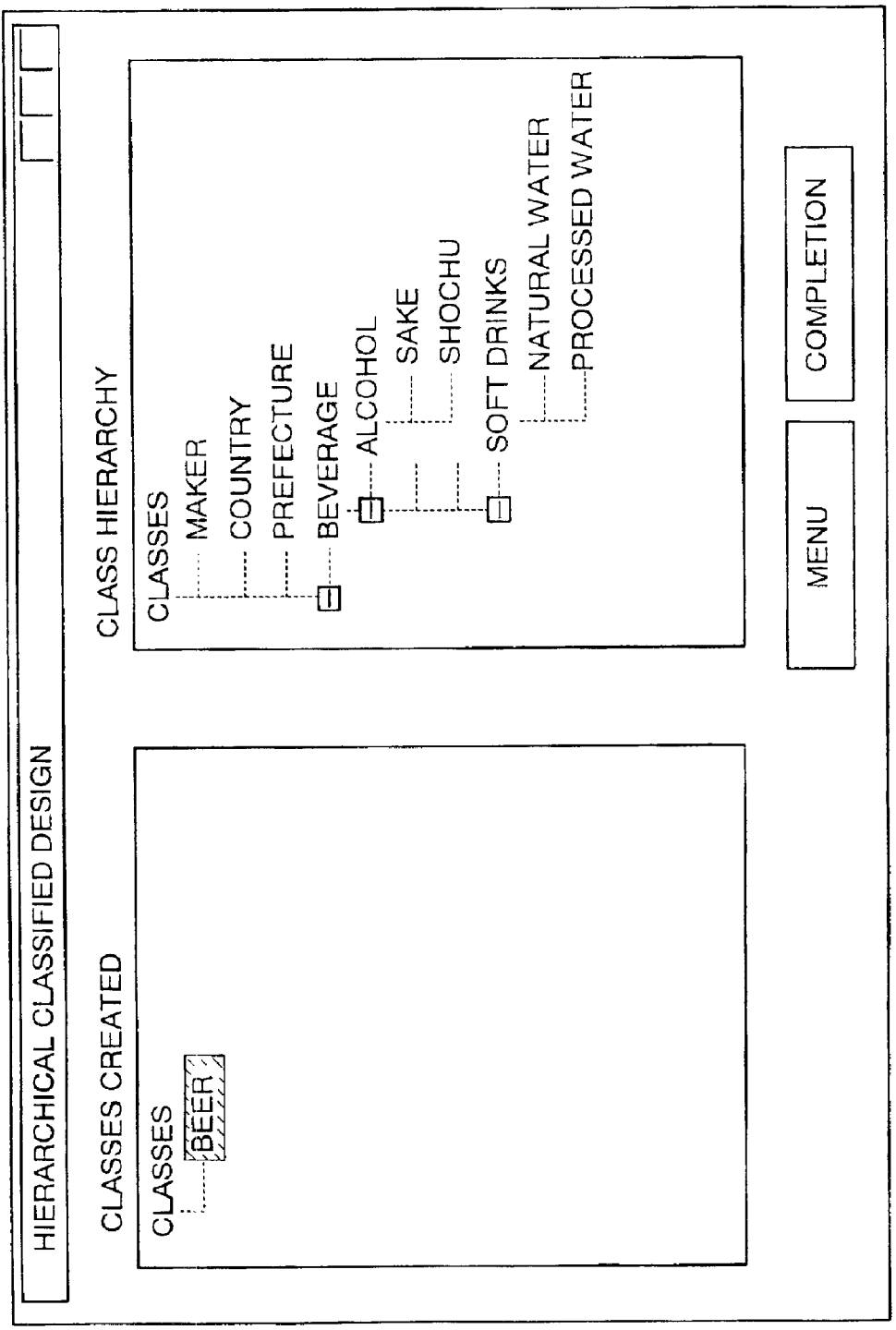
FIG. 11 is a view showing a second screen of a screen of hierarchical classified design.
Figure 12:
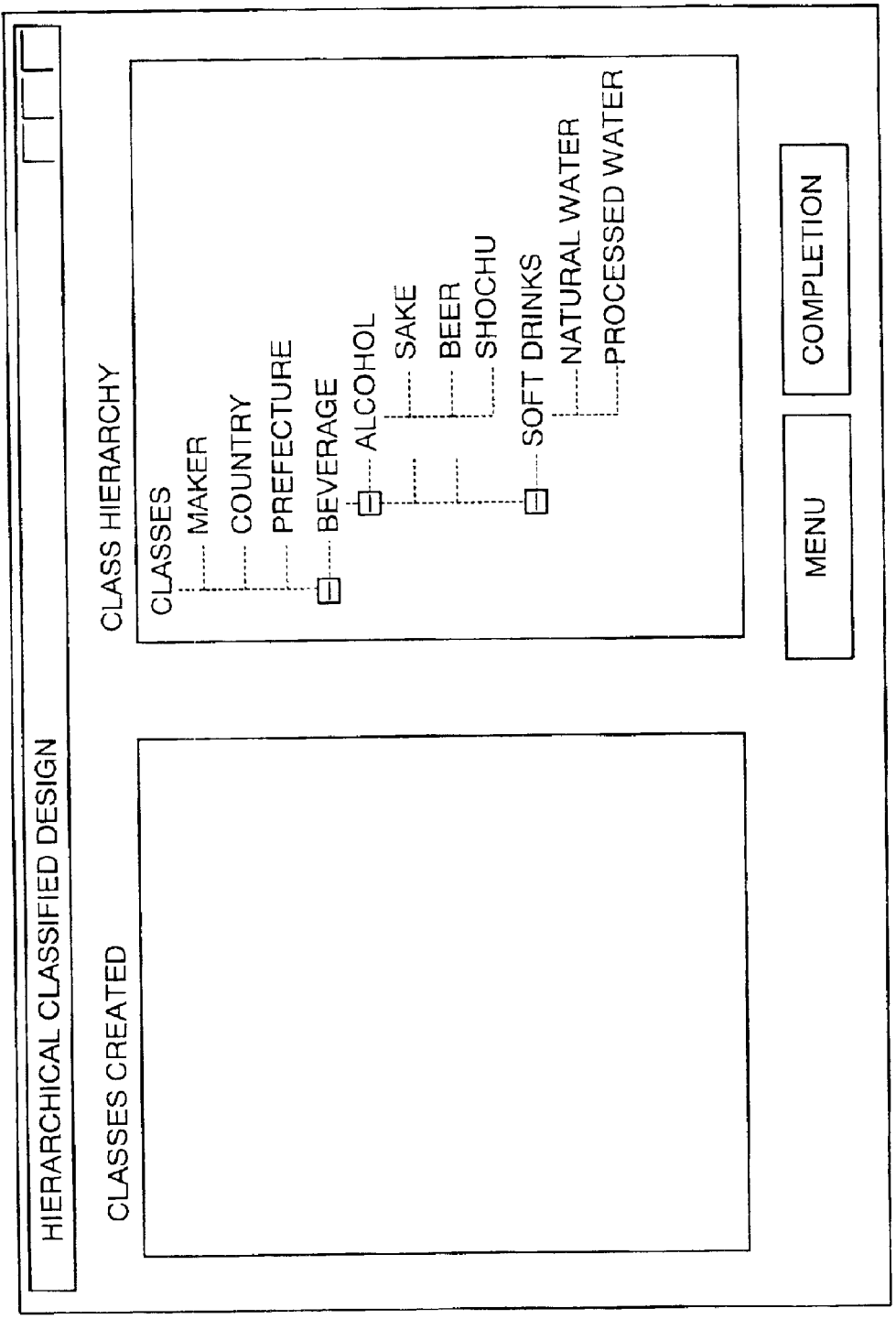
FIG. 12 is a view showing a third screen of a screen of hierarchical classified design.

FIG. 10 is a view showing a first screen of a screen of hierarchical classified design. FIG. 11 is a view showing a second screen of a screen of hierarchical classified design. FIG. 12 is a view showing a third screen of a screen of hierarchical classified design.

As shown in FIG. 10, on the window at the right side, there is displayed a class list created by the "creation of classes" processing shown in FIG. 4. Thus, a user performs a hierarchical classified design through selection of the desired class name and drag and drop into the window of right side of the screen (step 11_9).

On the window at the right hand of the screen in FIG. 11, there is displayed a hierarchical structure of classes already established. On the window at the left hand of the screen in FIG. 11, it is displayed that "beer" not yet established in form of the class remains. When a user selects "beer" displayed on the window at the left hand of the screen, and drags and drops it between the class "sake" and the class "shochu" on the window at the right side of the screen (step 11_10), as shown in FIG. 12, the class "beer" is newly set up under the class "sake" of the class "alcohol".

When the button "completion" is depressed at the time point that set up of the hierarchy for the entire classes is terminated (a step 11_11), the process goes to a step 11_12 in which class hierarchy information is automatically stored in the correlation information repository 15 (cf. FIG. 1).

Next, a definition of the ODB is automatically created in accordance with the above-mentioned class hierarchy information. The ODB definition information thus created is stored in the ODB repository 31 (cf. FIG. 1) (step 11_13).

In this manner, the RDB definition information extracting means 11 extracts RDB definition information from an RDB repository 21 describing therein definition information of the relational database 20, and the repository creating means 12 creates the ODB repository 31 describing therein definition information of the object database associated with the RDB definition information in accordance with the RDB definition information extracted by the RDB definition information extracting means 11 and creates correlation information repository 15 defining mutual relationship between the RDB definition information and ODB definition information.

FIG. 13 is a view showing a structure of a correlation information repository created in accordance with the present embodiment.

Figure 23:
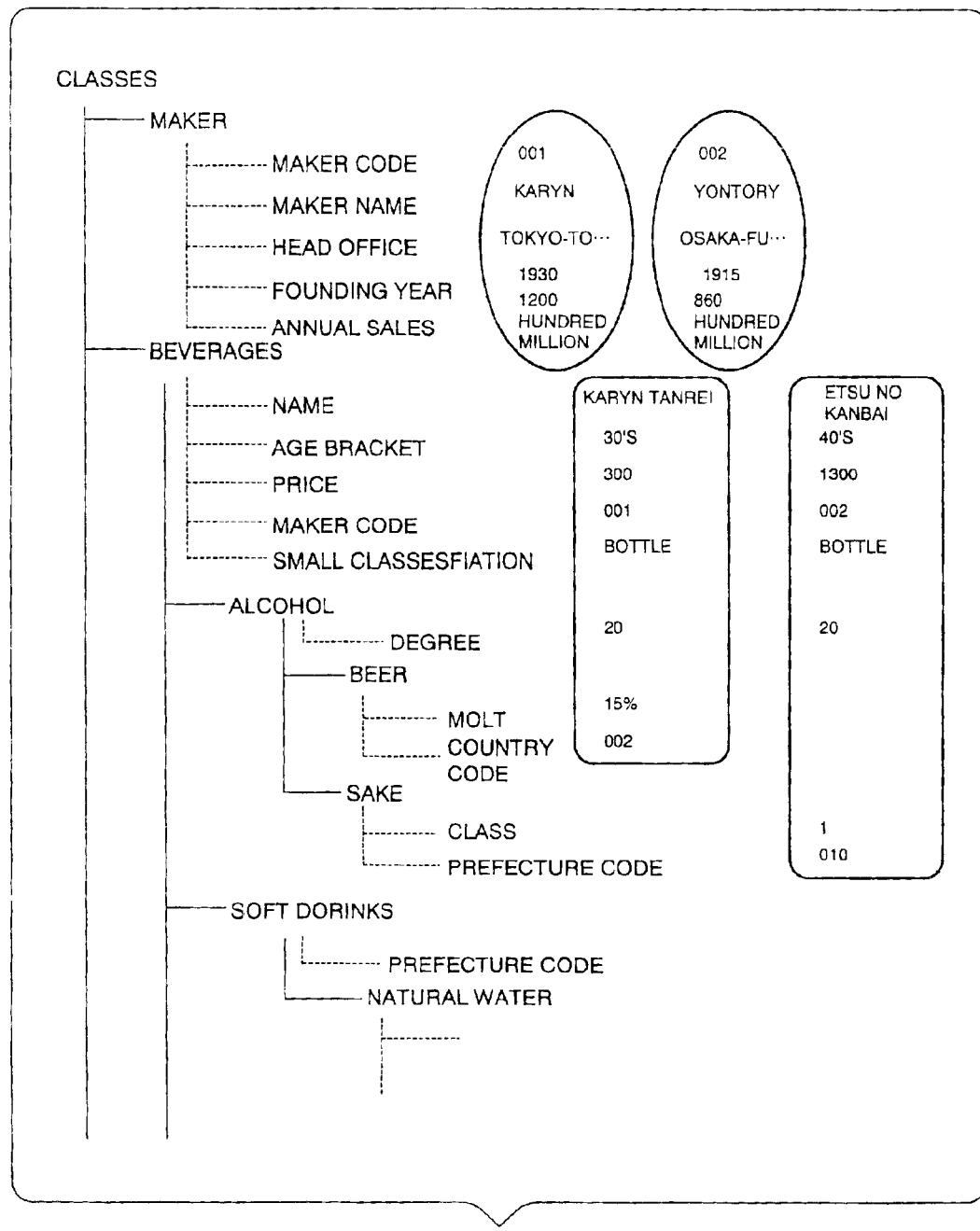
FIG. 23 is a view showing an example of ODB data.

For example, on the first line of FIG. 13, it is described that an attribute "maker code" of a class "maker" of an ODB corresponds to an item "maker code" of a table "maker" of an RDB, the attribute being provided with an index, and the hierarchy level is 1. Further, on the fourth line of FIG. 13, it is described that an attribute "malt" of a class "beer" of an ODB corresponds to an item "malt" of a table "beverage" of an RDB, the attribute being not provided with an index, and the hierarchy level is "2-1-1", that is, as shown in FIG. 23, the class "beer" is expressed by a hierarchical classified design in form of the "first" class of a third hierarchy of class, of the "first" class "alcohol" of a second hierarchy of class, of the "second" class "beverage" of a first hierarchy of class, and the attribute "malt" is set up as the attribute "beer" through a subdivision of one in which the value of the item "middle classification" of the table "beverage" of RDB is "beer".

The correlation information repository 15 is very important for data transition processing and application program conversion processing, which will be described later.

As mentioned above, according to the database transition system of the present invention, a user can create management information necessary for a transition of database in short time without occurrence of a mistake through only performing simple selection operation and drag and drop operations in accordance with information displayed on the screen by the computer system. Further, the user can perform a database transition exactly and promptly without necessity for knowledge of properties of databases of RDB and ODB and their detailed data structures.

Next, there will be explained "data transition" processing in which data of a relational database is changed over to an object database by the data transition means in the present embodiment.

The data transition comprises "data extraction from RDB" processing and "data storage to ODB" processing. Those types of processing are executed by the transition scheduling.

Figure 14:
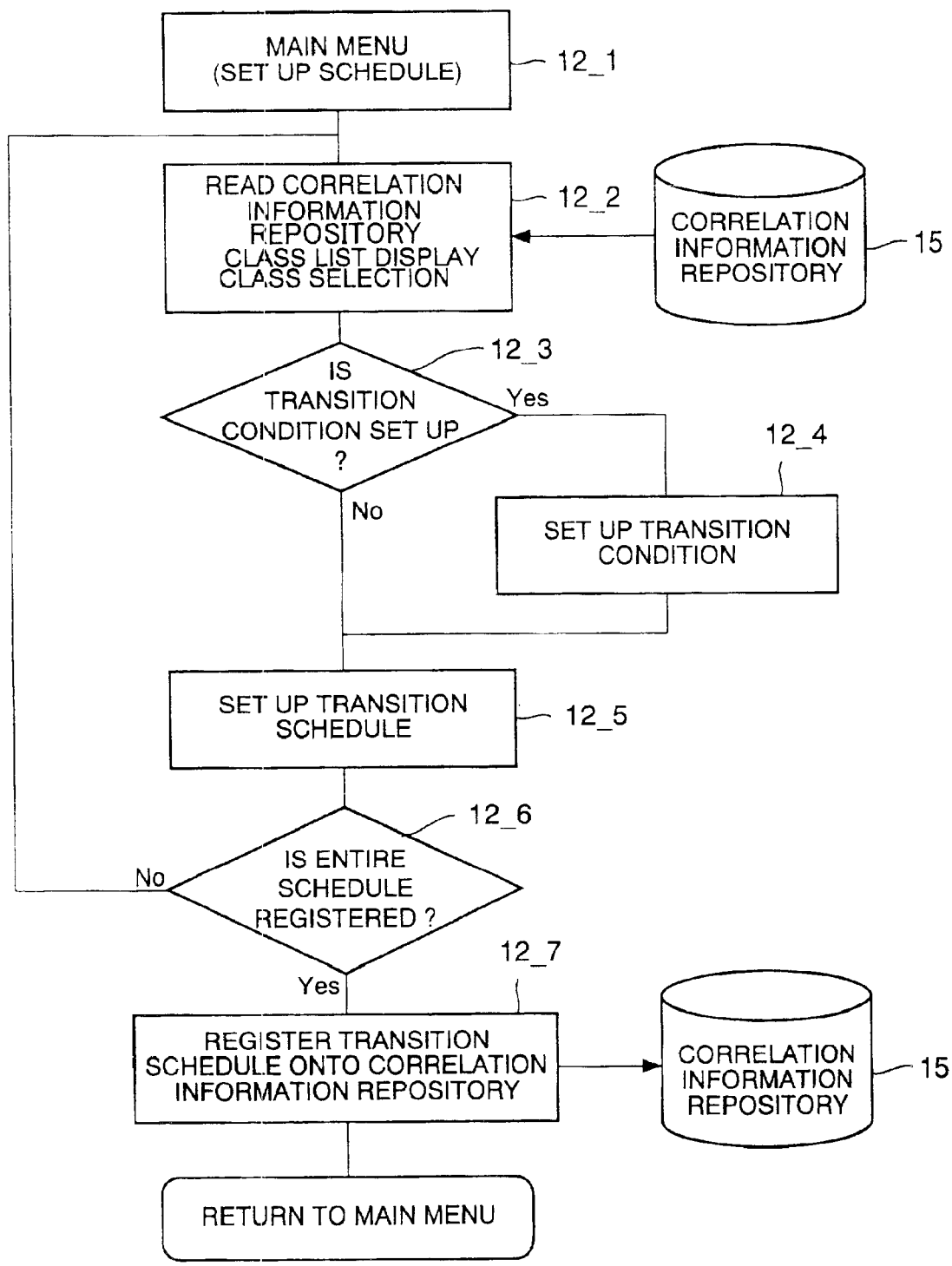
FIG. 14 is a flowchart for "set up of transition schedule" processing which is a first half portion of "schedule execution" processing executed by data transition means in the present embodiment.

FIG. 14 is a flowchart for "set up of transition schedule" processing which is a first half portion of "schedule execution" processing executed by data transition means in the present embodiment.

As shown in FIG. 14, when "schedule execution" in the subsystem "data transition" of the main menu (cf. FIG. 3) is clicked, first, the schedule set up processing starts (step 12_1), and a class list is read from the correlation information repository 15 (cf. FIG. 1) and is displayed on the screen which is substantially the same as the screen shown in FIG. 10 (step 12_2). When a user selects a transition object class from the class list, a message "is the transition condition set up?" is displayed. Thus the user clicks either of "yes" or "no" buttons (step 12_3).

To extract data from RDB data, in the event that it is desired to limit data in extraction condition, for example, "data after Dec. 1, 1998", the button "yes" is clicked on this screen, and then the extraction condition, for example, "date>=19981201" is entered onto a window (not illustrated) for a transition condition input. This makes it possible to set up the transition condition (step 12_4). In the event that it is desired to change over the entire data without set up of the extraction condition, the button "no" is clicked for the message "is the transition condition set up?". This makes it possible to set up the transition schedule (step 12_5).

FIG. 15 is a view showing a transition schedule set up screen in "data transition" processing.

In set up of the transition schedule of the step 12_5, as shown in FIG. 15, the class name as the transition object, which is selected in the step 12_2, is displayed on the upper portion of the screen. A user inputs into a predetermined window the transition request prearranged date, the transition request prearranged time, and the recipe for errors during execution of the schedule. When the "completion" is clicked, a message that is the entire schedule entered?" is displayed (step 12_6). When the button "no" is clicked, the process returns to the class selection processing in the step 12_2 to additionally set u p the transition schedule. When the button "yes" is clicked, the schedule information set up is entered onto the correlation information repository 15 (cf. FIG. 1) (step 12_7).

The data transition means 13 starts the "schedule automatic execution" processing at the time requested by a user in accordance with the transition schedule thus set up.

Figure 16:
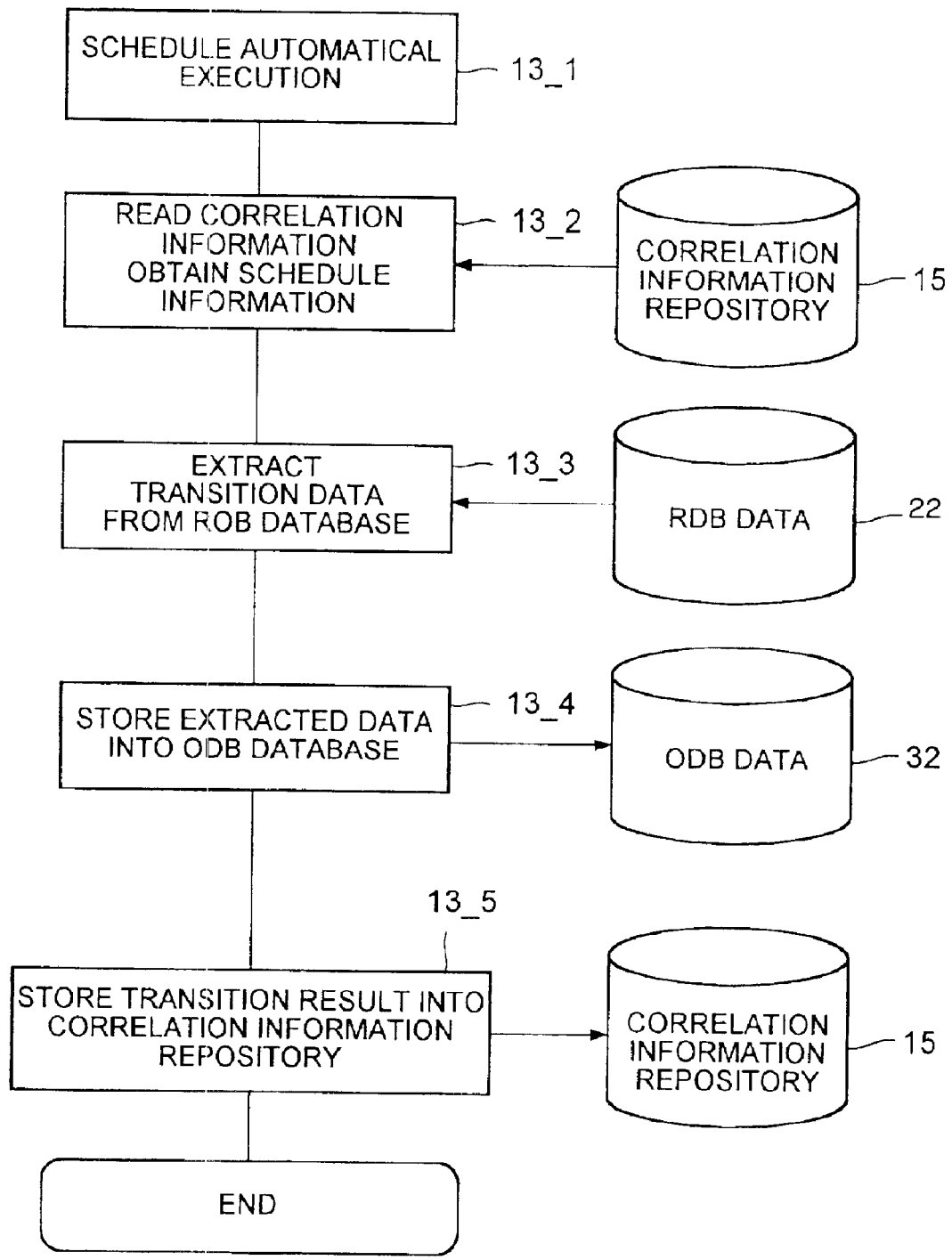
FIG. 16 is a flowchart for "schedule automatic execution" processing executed by data transition means.

FIG. 16 is a flowchart for the "schedule automatic execution" processing executed by the data transition means. When the "schedule automatic execution" processing starts (step 13_1), as shown in FIG. 16, first, schedule information is read from the correlation information repository 15 (step 13_2) to discriminate RDB information of an extraction source and transition condition, and then transition data is extracted from an RDB data file 22 (step 13_3). When the data extraction is completed, the extracted data is stored in an ODB data file 32 (step 13_4). Lastly, a transition result is stored in the correlation information repository 15 to terminate the processing (step 13_5)

Incidentally, in the event that a result of data transition or a progress situation of the schedule is confirmed, when "execution situation inquiry" of the submenu "data transition" of the main menu screen (cf. FIG. 3) is clicked, the data transition means 13 derives schedule information from the correlation information repository 15 and displays an "execution situation inquiry" screen.

FIG. 17 is a view showing "execution situation inquiry" displayed by data transition means.

As shown in FIG. 17, execution date, execution time and state of each class, and result information are displayed in form of a table. In the event that it is desired to alter or cancel a schedule, it is possible to alter or cancel the schedule using this screen. In the event that it is desired to terminate the processing, a click of the button "menu" at the lower right of the screen of FIG. 17 makes it possible to return the screen to the main menu screen.

According to the database transition system of the present embodiment, as mentioned above, data transition is automatically performed almost requiring no operation of a user, and thus it is possible to change over data of the relational database to the object database in short time without occurrence of a mistake.

Next, there will be described a conversion processing, by the application program conversion means provided on the present embodiment, from the application program described with a relational database based language into the application program described with an object database based language.

Incidentally, in the following explanation, there will be described an example in which SQL language and ODQL language are used as a relational database based language and an object database based language, respectively. However, the present invention is not restricted to those specified languages.

Figure 18:
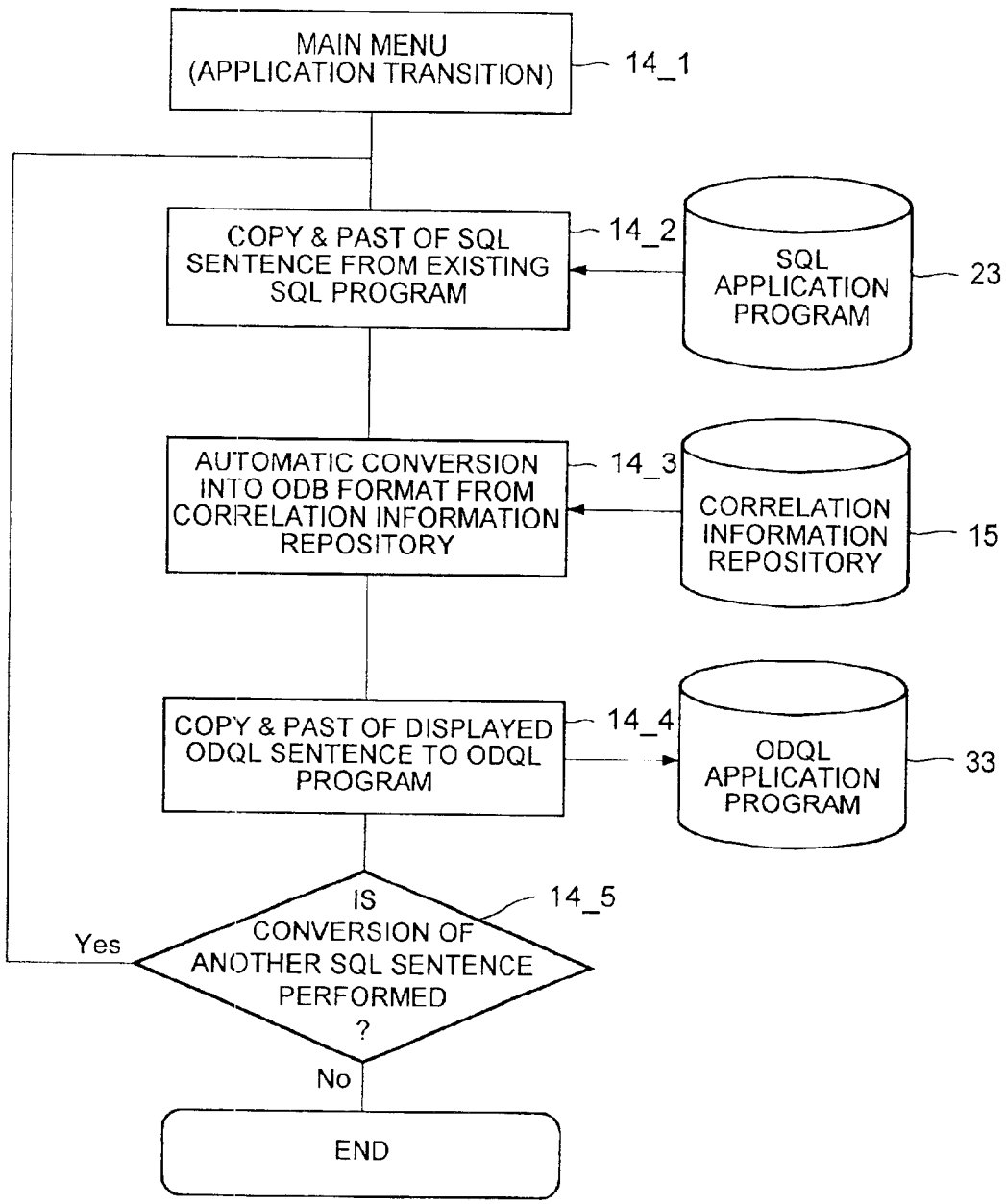
FIG. 18 is a flowchart for conversion processing to an application program in the present embodiment.

FIG. 18 is a flowchart for conversion processing to an application program in the present embodiment.

As shown in FIG. 18, a conversion processing starts when "transition from SQL to ODQL" of "application transaction" of the main menu (cf. FIG. 3) is clicked (step 14_1).

In the event that an RDB operation sentence by an SQL sentence exists in a developed application program, in which the SQL sentence is incorporated into an application program, for example, an application program described in COBOL language, a user extracts only the SQL sentence from the application program.

Figure 19:
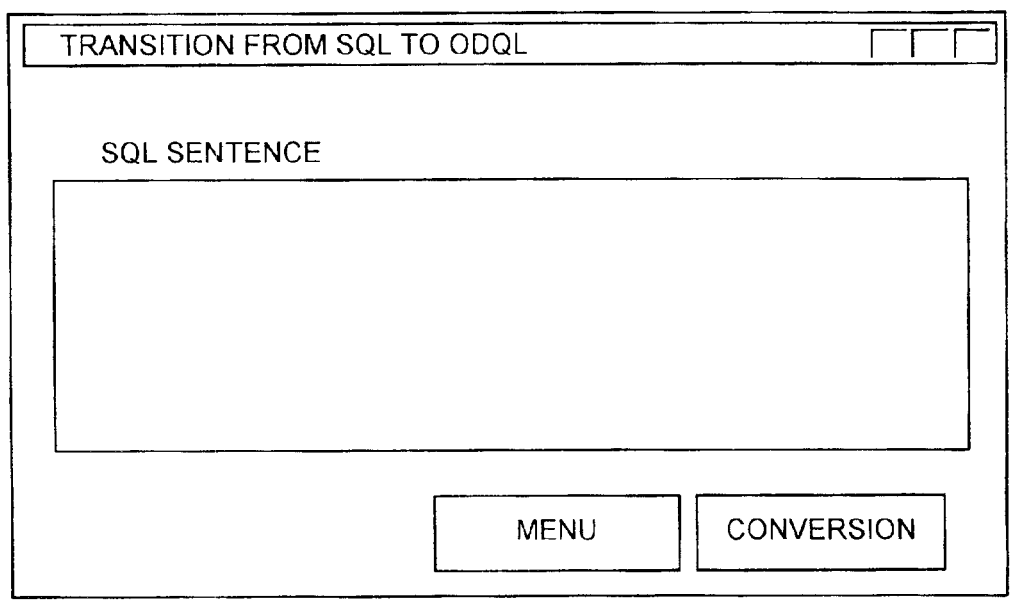
FIG. 19 is a view showing a transition screen displaying an SQL sentence extracted by a user from application program.

FIG. 19 is a view showing a transition screen displaying an SQL sentence extracted by a user from an application program.

A user extracts the SQL sentence from the application program as a transition object, and pastes it onto a box at the center of a transition screen in FIG. 19 through copy & paste operation (step 14_2).

Figure 20:
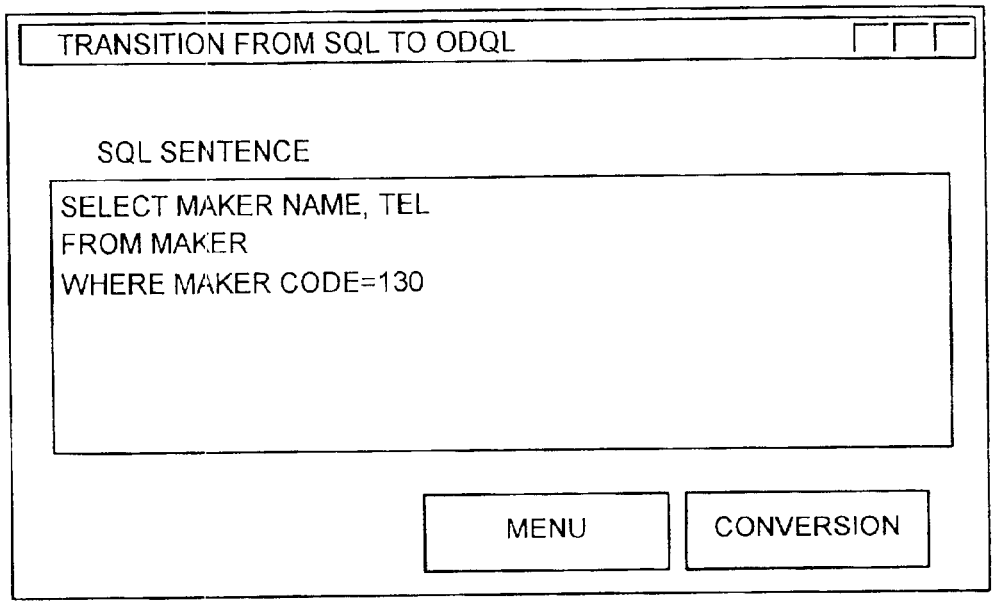
FIG. 20 is a view showing a transition screen in which an example of an SQL sentence extracted by a user is displayed.
Figure 21:
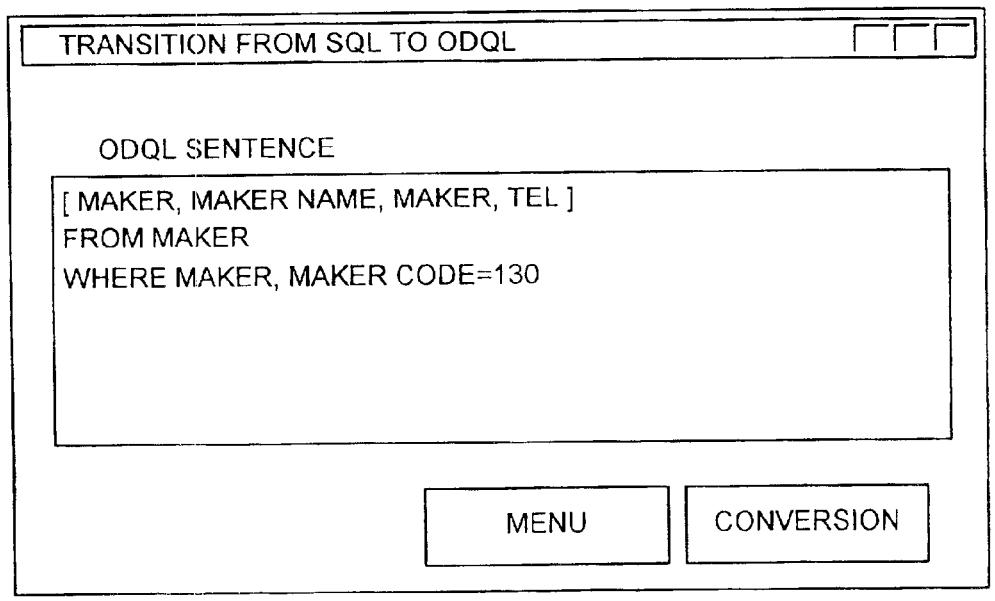
FIG. 21 is a view showing a transition screen in which an example of an ODQL sentence automatically converted by an application program conversion means is displayed.

FIG. 20 is a view showing a transition screen in which an example of an SQL sentence extracted by a user is displayed. FIG. 21 is a view showing a transition screen in which an example of an ODQL sentence automatically converted by an application program conversion means is displayed.

In FIG. 20, there is displayed, by way of example, an SQL sentence "Select" extending over three lines. When a button "conversion" at the lower right of a transition screen in FIG. 20 is clicked, the application program conversion means 14 (cf. FIG. 14) automatically converts the SQL sentence into an ODQL sentence, as shown in FIG. 21, referring to information relating to the mutual relation between an ODB and an RDB, which is read from the correlation information repository 15 (cf. FIG. 1) (step 14_3). A user pastes the ODQL sentence thus converted onto a new program through copy & paste operation. This makes it possible to complete the ODQL application program. The ODQL application program thus created is stored in the ODL application program 33 (step 14_4). Next, a message "is a conversion for another SQL sentence performed?" is displayed. Then in the event that a conversion of another SQL is to be further continued, the button "yes" is clicked, so that the process returns to the step 14_2 and thereby permitting a continuation of the conversion. In the event that the conversion is terminated, the button "no" is clicked. This makes it possible that the program returns to the main menu (cf. FIG. 3) (step 14_5).

In this manner, according to the database transition system of the present embodiment, it is sufficient for a user to perform only operation of extracting an SQL sentence to be converted from an SQL program, and operation of pasting an ODQL sentence subjected to an automatic conversion onto a new program through copy & paste operation. Thus, the user can exactly execute an application program without considering properties of RDB and ODB and the detail data structure.

What is claimed is:

1. An automated method for changing over an existing relational database to a new and separate persistent object database where the relational database persistently stores a set of data as relational data and where the object database persistently stores objects as database entities corresponding to the relational data without using the relational database, said method comprising:

automatically extracting RDB definition information from an RDB repository describing therein definition information of the relational database, the definition information describing at least tables in the relational database, which is a transition object from which the object database is to be created; and automatically creating an ODB repository describing therein definition information of the object database associated with the RDB definition information in accordance with the extracted RDB definition information and creating a correlation information repository defining mutual relationship between the RDB definition information and ODB definition information.

2. A database transition system for using an existing persistent relational database to create a persistent object database, where the relational database persistently stores a set of data as relational data and where the object database persistently stores objects as database entities corresponding to the relational data without using the relational database, said database transition system comprising:

a relational database (RDB) definition information extracting unit extracting RDB definition information from an RDB repository storing the relational database and describing therein definition information of the relational database, the definition information describing at least tables in the relational database, where the relational database is a transition object from which the object database is to be created; and a repository creating unit creating an object database (ODB) repository describing therein definition information of the object database associated with the RDB definition information in accordance with the RDB definition information extracted by said RDB definition information extracting unit and creating a correlation information repository defining mutual relationship between the RDB definition information and ODB definition information.

3. A database transition system according to claim 2, wherein said database transition system further comprises data transition unit converting data of the relational database into the object database in accordance with the correlation information repository created by said repository creating unit.

4. A database transition system according to claims 2, wherein said database transition system further comprises an application program conversion unit converting an application program described in a relational database based language into an application program described in an object database based language in accordance with the correlation information repository created by said repository creating unit.

5. A program storage medium storing a database transition processing program for using an existing persistent relational database to create a persistent object database, where the relational database persistently stores a set of data as relational data and where the object database persistently stores objects as database entities corresponding to the relational data without using the relational database, wherein said database transition processing program comprises:

an RDB definition information extracting unit extracting RDB definition information from an RDB repository storing the relational database and describing therein definition information of the relational database, the definition information describing at least tables in the relational database, where the relation database is a transition object from which the object database is to be created; and a repository creating unit creating an ODB repository describing therein definition information of the object database associated with the RDB definition information in accordance with the RDB definition information extracted by said RDB definition information extracting unit and for creating correlation information repository defining mutual relationship between the RDB definition information and ODB definition information.

6. A program storage medium according to claim 5, wherein said database transition processing program further comprises a data transition unit converting data of the relational database into the object database in accordance with the correlation information repository created by said repository creating unit.

7. A program storage medium according to claims 5, wherein said database transition processing program further comprises an application program conversion unit converting an application program described in a relational database based language into an application program described in an object database based language in accordance with the correlation information repository created by said repository creating unit.

* * * * *